(12) United States Patent
Taylor et al.

(10) Patent No.: US 11,325,630 B2
(45) Date of Patent: May 10, 2022

(54) MULTI CHILD STROLLER

(71) Applicant: Wonderland Switzerland AG, Steinhausen (CH)

(72) Inventors: Andrew J. Taylor, Mohnton, PA (US); Robert E. Haut, Merion Station, PA (US)

(73) Assignee: WONDERLAND SWITZERLAND AG, Steinhausen (CH)

( * ) Notice: Subject to any disclaimer, the term of this patent is extended or adjusted under 35 U.S.C. 154(b) by 0 days.

(21) Appl. No.: 16/868,552

(22) Filed: May 7, 2020

(65) Prior Publication Data
US 2020/0353965 A1 Nov. 12, 2020

Related U.S. Application Data

(60) Provisional application No. 62/844,333, filed on May 7, 2019, provisional application No. 62/884,375, filed on Aug. 8, 2019.

(51) Int. Cl.
*B62B 7/00* (2006.01)
*B62B 7/14* (2006.01)
*B60N 2/28* (2006.01)
*B62B 7/08* (2006.01)
*B62B 7/06* (2006.01)

(52) U.S. Cl.
CPC ............... *B62B 7/008* (2013.01); *B60N 2/28* (2013.01); *B62B 7/06* (2013.01); *B62B 7/08* (2013.01); *B62B 7/14* (2013.01); *B62B 7/142* (2013.01); *B62B 7/145* (2013.01)

(58) Field of Classification Search
CPC ........... B62B 7/008; B62B 7/06; B62B 7/145; B62B 7/142; B62B 7/08; B60N 2/28
See application file for complete search history.

(56) References Cited

U.S. PATENT DOCUMENTS

| | | | | |
|---|---|---|---|---|
| 2,783,053 A | * | 2/1957 | Sheldrick | .................. B62B 7/08 280/643 |
| 3,235,279 A | | 2/1966 | Smith | |
| 3,998,490 A | | 12/1976 | Lallave | |
| 5,104,180 A | * | 4/1992 | Takahashi | ................. B62B 7/06 297/16.1 |
| 5,195,770 A | | 3/1993 | Ishikura | |
| 5,333,893 A | | 8/1994 | Chen | |

(Continued)

FOREIGN PATENT DOCUMENTS

| | | |
|---|---|---|
| CN | 1299758 A | 6/2001 |
| CN | 2635486 Y | 8/2004 |

(Continued)

*Primary Examiner* — Erez Gurari
(74) *Attorney, Agent, or Firm* — Fay Kaplun & Marcin, LLP (57) ABSTRACT

A multi child stroller includes a stroller frame and a first seat. The stroller frame has two sections adapted to fold and unfold relative to each other. The first seat is disposed on one of the two sections. The first seat includes a first seat unit and a seat back positioning member. The first seat unit has a sliding slot portion. The seat back positioning member is rotatably disposed on the stroller frame. The seat back positioning member includes a sliding bar adapted to slide inside the sliding slot portion, so as to switch the first seat unit into one of a first unfolding mode, a second unfolding mode and a folding mode.

19 Claims, 10 Drawing Sheets

(56) References Cited

U.S. PATENT DOCUMENTS

| | | | |
|---|---|---|---|
| 5,338,096 A | 8/1994 | Huang | |
| 5,417,449 A | 5/1995 | Shamie | |
| 5,938,229 A * | 8/1999 | Chen | B62B 7/06 280/642 |
| 6,086,087 A | 7/2000 | Yang | |
| 6,412,809 B1 | 7/2002 | Bigo | |
| 9,227,650 B2 | 1/2016 | Gillett | |
| 9,399,477 B2 | 7/2016 | Iftinca | |
| 9,517,787 B2 | 12/2016 | Zehfuss | |
| 9,849,903 B1 | 12/2017 | Lai | |
| 10,293,843 B2 | 5/2019 | Naslain | |
| 2003/0227157 A1 | 12/2003 | Bretschger | |
| 2004/0094935 A1 | 5/2004 | Fair | |
| 2004/189076 A1 | 9/2004 | Hanson et al. | |
| 2010/0038886 A1 | 2/2010 | Greger | |
| 2011/0031708 A1 | 2/2011 | Cheng | |
| 2011/0175306 A1 | 7/2011 | Newhard | |
| 2011/0291389 A1 | 12/2011 | Offord | |
| 2014/0021697 A1 | 1/2014 | Kikui | |
| 2016/0229439 A1 * | 8/2016 | Zhong | B62B 7/008 |
| 2018/0201291 A1 | 7/2018 | Liu | |
| 2018/0244295 A1 | 8/2018 | Storm | |
| 2019/0210628 A1 | 7/2019 | Zhao | |
| 2020/0353966 A1 * | 11/2020 | Taylor | B62B 7/145 |

FOREIGN PATENT DOCUMENTS

| | | |
|---|---|---|
| CN | 202345741 U | 7/2012 |
| CN | 103085850 A | 5/2013 |
| CN | 205034158 U | 2/2016 |
| CN | 107031689 A | 8/2017 |
| CN | 108248661 A | 7/2018 |
| CN | 108327769 A | 7/2018 |
| CN | 108583670 A | 9/2018 |
| GB | 2 163 644 A | 3/1986 |
| GB | 2 392 886 A | 3/2004 |
| GB | 2481138 A | 12/2011 |
| GB | 2523251 A | 8/2015 |
| GB | 2550022 A | 11/2017 |
| JP | 2018-043710 A | 3/2018 |

* cited by examiner

MULTI CHILD STROLLER

CROSS REFERENCE TO RELATED APPLICATION

This application claims the benefit of U.S. provisional application No. 62/844,333 filed on May 7, 2019 and No. 62/884,375 filed on Aug. 8, 2019, which is all incorporated herein by reference.

BACKGROUND OF THE INVENTION

1. Field of the Invention

The present invention relates to a multi child stroller, and more particularly, to a multi child stroller with a smaller size and having several unfolding states in a service mode.

2. Description of the Prior Art

A conventional double child stroller includes a plurality of structural components assembled in a complicated manner, and requires removal of some structural components before folding the double child stroller into a compact mode. The conventional double child stroller typically has a large folded size and has a drawback of inconvenient storage. Another conventional double child stroller that can be folded more compactly has drawbacks of a minimal seat for the occupant and smaller basket storage, and does not offer a raised seat for a younger child to be near the parent.

SUMMARY OF THE INVENTION

The present invention provides a multi child stroller with a smaller size and having several unfolding states in a service mode for solving above drawbacks.

According to the claimed invention, a multi child stroller includes a stroller frame and a first seat. The stroller frame has two sections adapted to fold and unfold relative to each other. The first seat is disposed on one of the two sections. The first seat includes a first seat unit and a seat back positioning member. The first seat unit has a sliding slot portion. The seat back positioning member is rotatably disposed on the stroller frame. The seat back positioning member includes a sliding bar adapted to slide inside the sliding slot portion, so as to switch the first seat unit into one of a first unfolding mode, a second unfolding mode and a folding mode.

According to the claimed invention, the first seat further includes a seat body positioning member rotatably connected between the first seat unit and the stroller frame. The seat body positioning member positions the first seat unit in the folding mode in response to the stroller frame being folded, and further positions the first seat unit in a service mode in response to the stroller frame being unfolded.

According to the claimed invention, two ends of the seat body positioning member are respectively connected to a first seat body of the first seat unit and a supporting member of the stroller frame.

According to the claimed invention, the seat back positioning member positions the first seat unit in the folding mode in response to the stroller frame being folded, and further positions the first seat unit in the first unfolding mode or the second unfolding mode of a service mode in response to the stroller frame being unfolded.

According to the claimed invention, the first seat unit further includes a first seat back and a first seat body. The first seat back is rotatably connected to the first seat body, and the sliding slot portion is disposed on the first seat back.

According to the claimed invention, the seat back positioning member further includes a rotation plate disposed on the stroller frame. The sliding bar is connected to the rotation plate and slidably assembled with the sliding slot portion.

According to the claimed invention, the sliding bar is positioned at a lower area of the sliding slot portion to abut against the first seat back stayed at the first unfolding mode, and further positioned at a middle area of the sliding slot portion to switch the first seat back from the first unfolding mode to the second unfolding mode, and further positioned at an upper area of the sliding slot portion to allow the first seat back and the first seat body for being folded and switched to the folding mode.

According to the claimed invention, the first seat unit further includes an infant car seat connecting member movably disposed on the first seat body and adapted to connect with an attaching member of an external infant car seat.

According to the claimed invention, the infant car seat connecting member is accommodated inside the first seat body when the first seat unit is in the first unfolding mode, and further protrudes from the first seat body when the first seat unit is in the second unfolding mode.

According to the claimed invention, the first seat unit further includes a belting member connected to the infant car seat connecting member and the first seat back, and adapted to vary a position of the infant car seat connecting member relative to the first seat body when an inclined angle of the first seat back is changed.

According to the claimed invention, the belting member is a soft textile product or a solid buckling structure.

According to the claimed invention, the stroller frame includes a front leg member, a rear leg member, a supporting member and a handle member. The supporting member is rotatably disposed between the front leg member and the rear leg member. The front leg member is rotatably connected to an end of the handle member. The rear leg member is rotatably connected to a segment of the handle member adjacent to the foresaid end.

According to the claimed invention, the stroller frame further includes a locking member disposed between the front leg member and the handle member, and adapted to constrain relative position of the front leg member and the handle member for steadying the stroller frame in the folding mode or a service mode.

According to the claimed invention, the front leg member comprises a first wheel, and the rear leg member comprises a second wheel.

According to the claimed invention, the handle member is disposed above the front leg member and the rear leg member. The front leg member is set as a front section of the two sections. The handle member and the rear leg member are set as a rear section of the two sections.

According to the claimed invention, the first seat unit is rotatably disposed on the front leg member. The first seat further includes a seat body positioning member rotatably connected between the first seat unit and the stroller frame. The seat body positioning member is rotatably connected to the supporting member. The seat back positioning member is rotatably disposed on a connection position between the front leg member and the handle member.

According to the claimed invention, the multi child stroller further includes a bench seat rotatably disposed on the other section of the two sections.

According to the claimed invention, the multi child stroller further includes a stand platform disposed on the other section of the two sections and adjacent to the bench seat.

According to the claimed invention, the multi child stroller further includes a second seat detachably disposed on the other section of the two sections.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
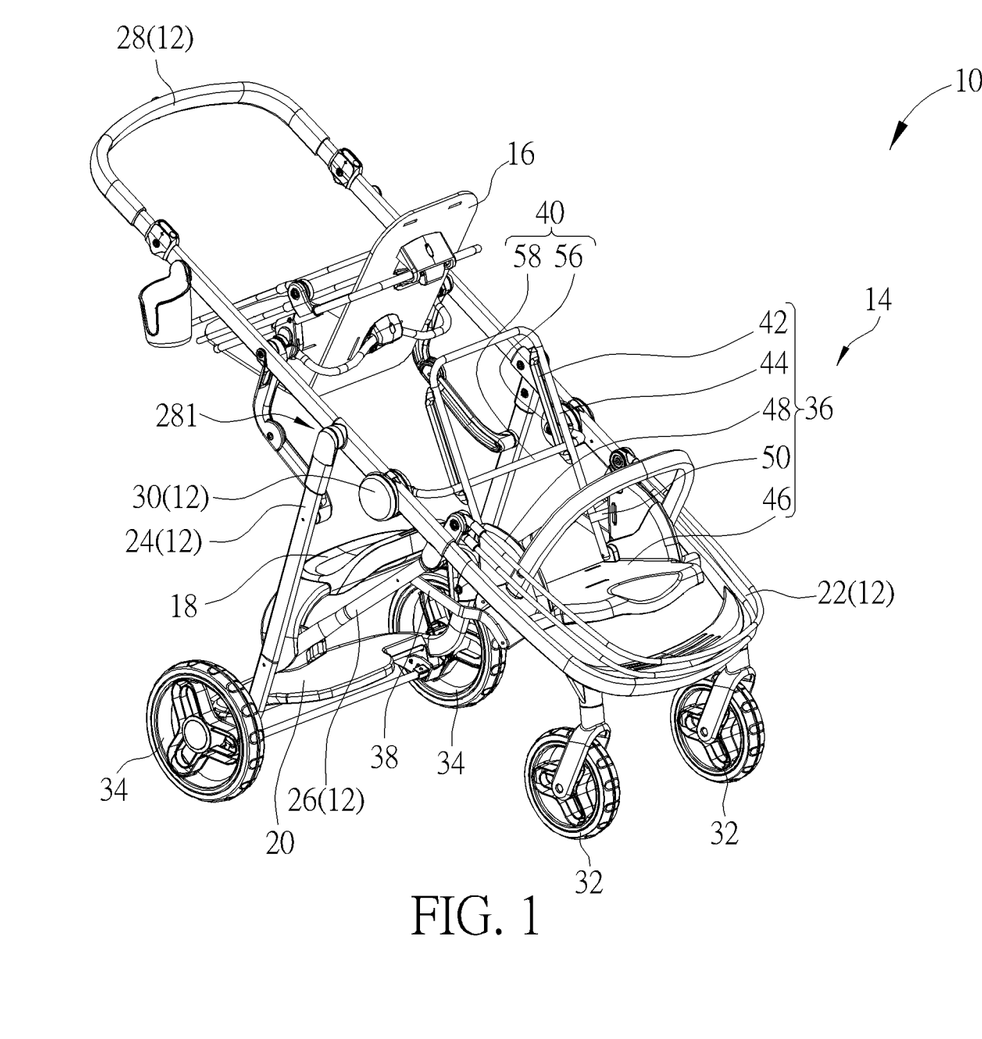
FIG. 1 and FIG. 2 are diagrams of a multi child stroller switched to a service mode in different view angles according to an embodiment of the present invention.
Figure 2:
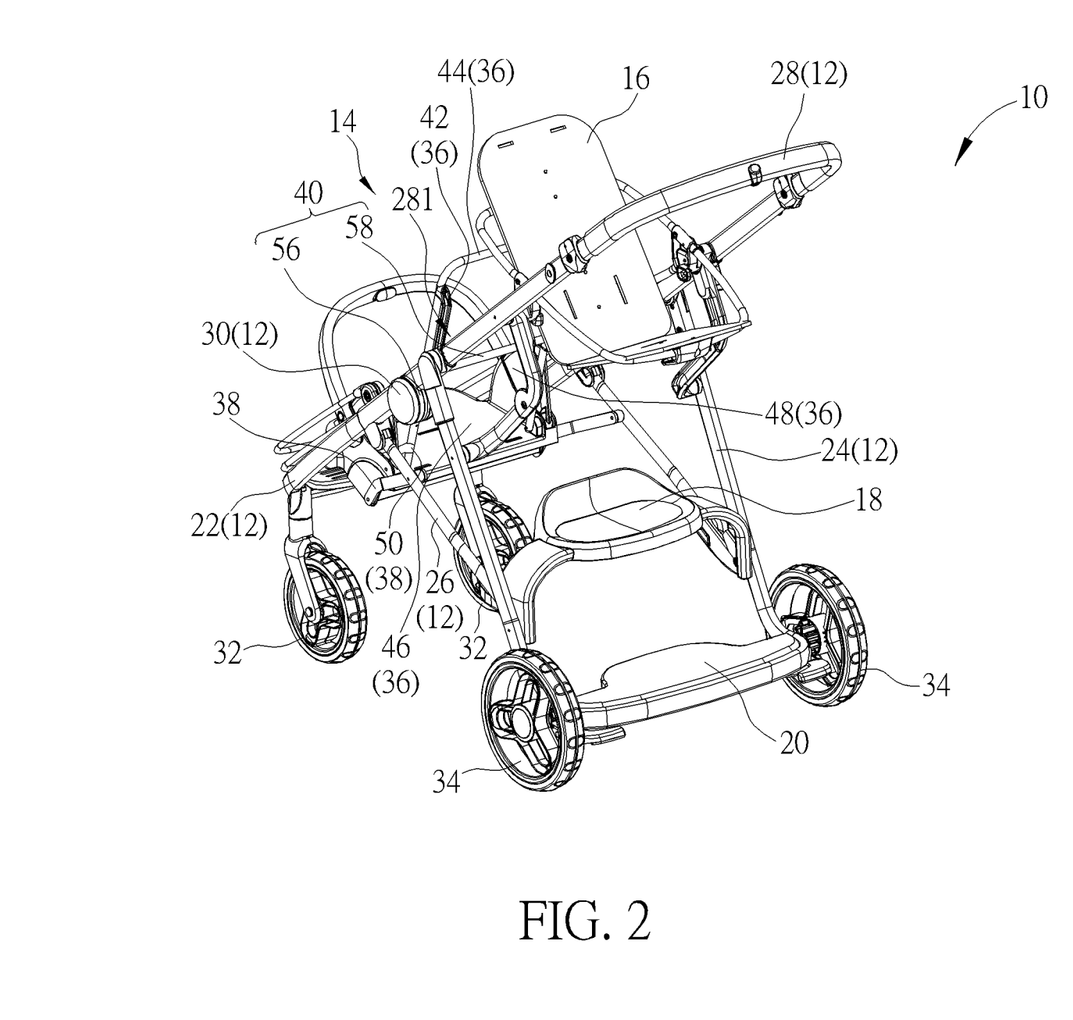
Figure 3:
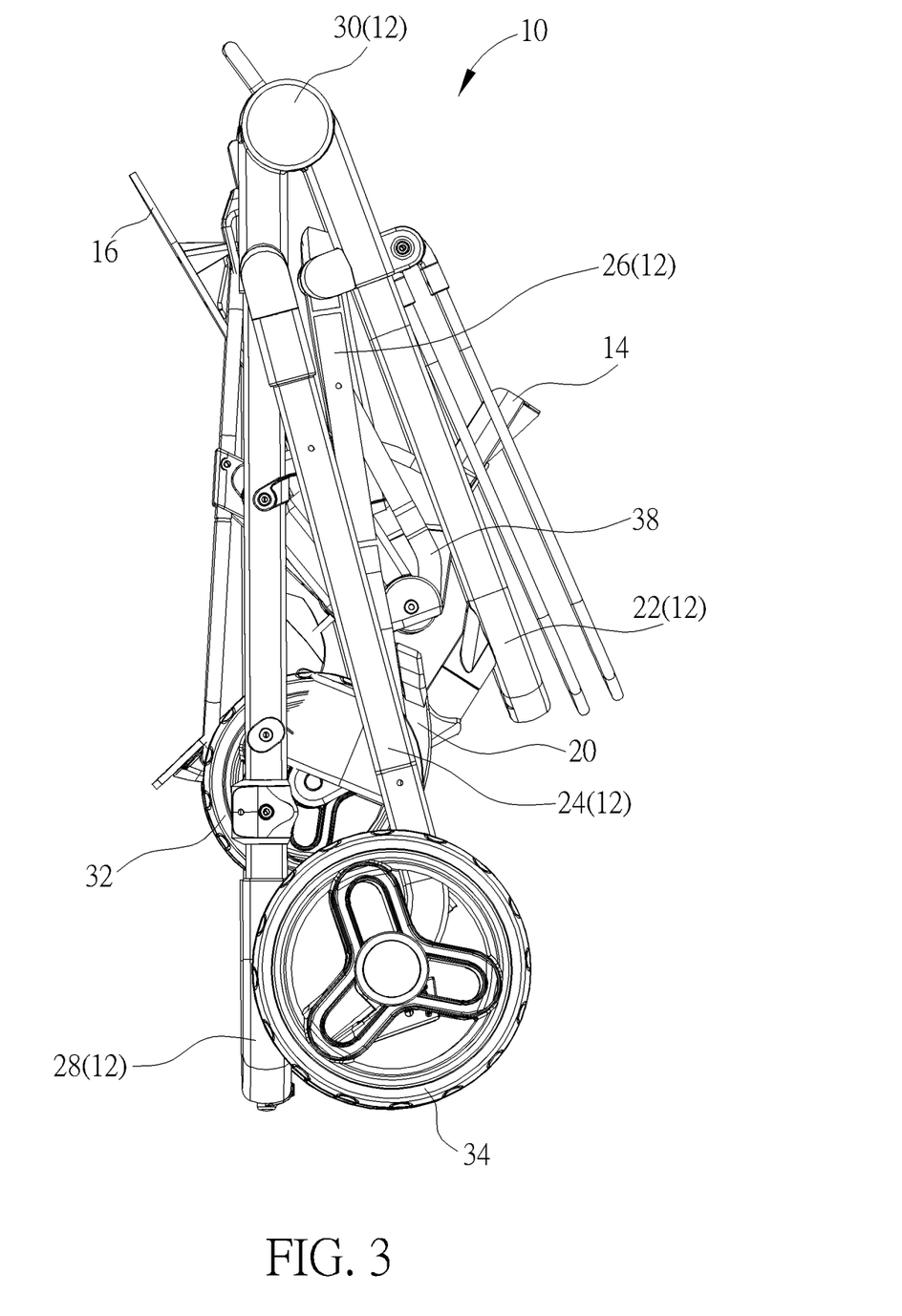
FIG. 3 is a diagram of the multi child stroller switched to a folding mode according to the embodiment of the present invention.

Please refer to FIG. 1 to FIG. 3. FIG. 1 and FIG. 2 are diagrams of a multi child stroller 10 switched to a service mode in different view angles according to an embodiment of the present invention. FIG. 3 is a diagram of the multi child stroller 10 switched to a folding mode according to the embodiment of the present invention. The multi child stroller 10 can include a stroller frame 12, a first seat 14, a second seat 16, a bench seat 18 and a stand platform 20. The stroller frame 12 can include a front leg member 22, a rear leg member 24, a supporting member 26, a handle member 28 and a locking member 30. The supporting member 26 can be rotatably disposed between the front leg member 22 and the rear leg member 24. One or several first wheel 32 can be disposed on a bottom of the front leg member 22. A top of the front leg member 22 can be rotatably connected to an end 281 of the handle member 28.

The rear leg member 24 can be rotatably connected to a segment of the handle member 28 adjacent to the end 281. One or several second wheel 34 can be disposed on a bottom of the rear leg member 24. The locking member 30 can be disposed between the front leg member 22 and the handle member 28, and used to constrain relative position of the front leg member 22 and the handle member 28, so as to steady the stroller frame 12 in the service mode shown in FIGS. 1-2 or in the folding mode shown in FIG. 3. The handle member 28 can be disposed above the front leg member 22 and the rear leg member 24. Thus, the front leg member 22 can be defined as a front section of the stroller frame 12, and the handle member 28 and the rear leg member 24 can be defined as a rear section of the stroller frame 12.

The front section and the rear section of the stroller frame 12 can be folded and unfolded relative to each other. The first seat 14 can be disposed on the front section in a detachable manner or in a undetachable manner; for example, the first seat 14 can be disposed on the front leg member 22, and further connected to the supporting member 26 and the handle member 28. The second seat 16 can be disposed on the rear section in the detachable manner; for example, the second seat 16 can be disposed on the handle member 28. The bench seat 18 and the stand platform 20 can be disposed on the rear section, such as the rear leg member 24. The bench seat 18 can be rotated relative to the rear leg member 24. The stand platform 20 can be adjacent to the bench seat 18, so that a child can easily step on the stand platform 20 when sitting the bench seat 18.

Please refer to FIG. 1, FIG. 2, and FIG. 4 to FIG. 10. FIG. 4 to FIG. 10 are diagrams of the multi child stroller 10 in different modes according to the embodiment of the present invention. The first seat 14 can include a first seat unit 36, a seat body positioning member 38 and a seat back positioning member 40. The first seat unit 36 can include a sliding slot portion 42, a first seat back 44, a first seat body 46, an infant car seat connecting member 48 and a belting member 50. The sliding slot portion 42 can be disposed on the back of the first seat back 44. The first seat back 44 can be rotatably connected to the first seat body 46. The first seat body 46 can be rotatably disposed on the front leg member 22. The infant car seat connecting member 48 can be movably disposed on the first seat body 46, and further optionally connected to an attaching member 54 of the infant car seat 52. The belting member 50 (not shown in FIG. 4 to FIG. 8) can be connected between the infant car seat connecting member 48 and the first seat back 44.

The seat body positioning member 38 can be rotatably connected between the first seat body 46 of the first seat unit 36 and the supporting member 26 of the stroller frame 12. The seat back positioning member 40 can be rotatably disposed on the stroller frame 12. The seat back positioning member 40 can include a rotation plate 56 and a sliding bar 58. The rotation plate 56 can be disposed on a connection position between the front leg member 22 and the handle member 28. The sliding bar 58 can be connected to the rotation plate 56 and slidably assembled with the sliding slot portion 42.

Figure 4:
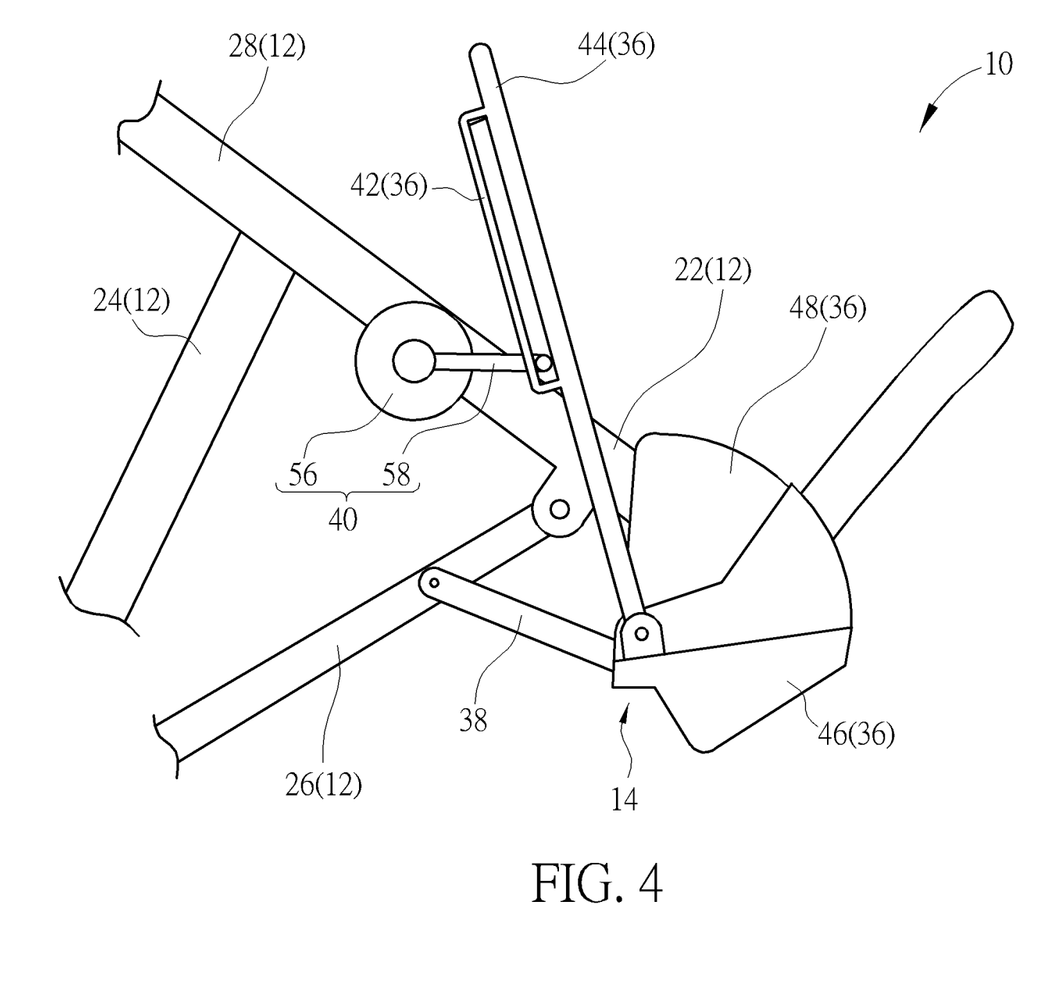
FIG. 4 to FIG. 10 are diagrams of the multi child stroller in different modes according to the embodiment of the present invention.
Figure 5:
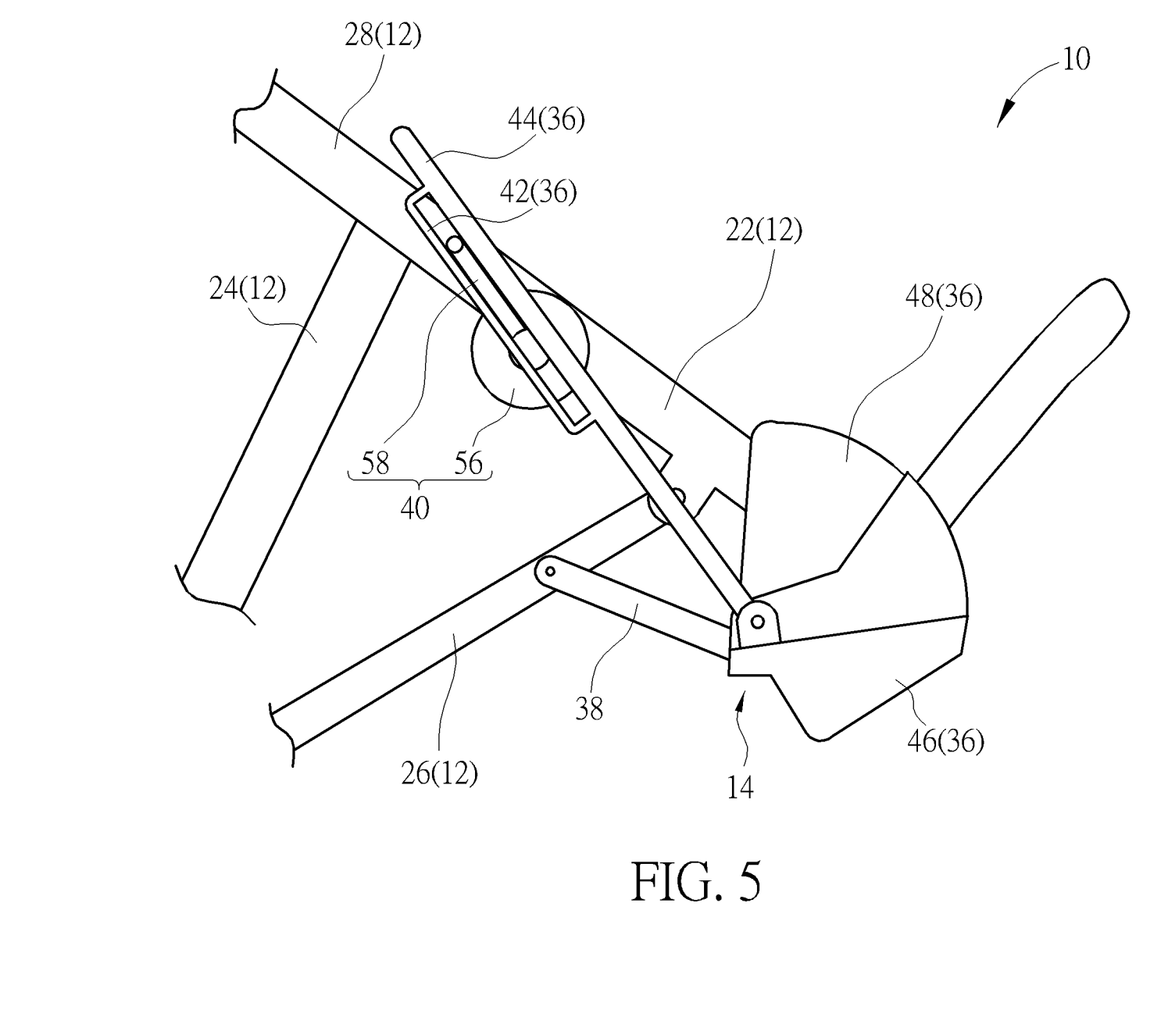
Figure 6:
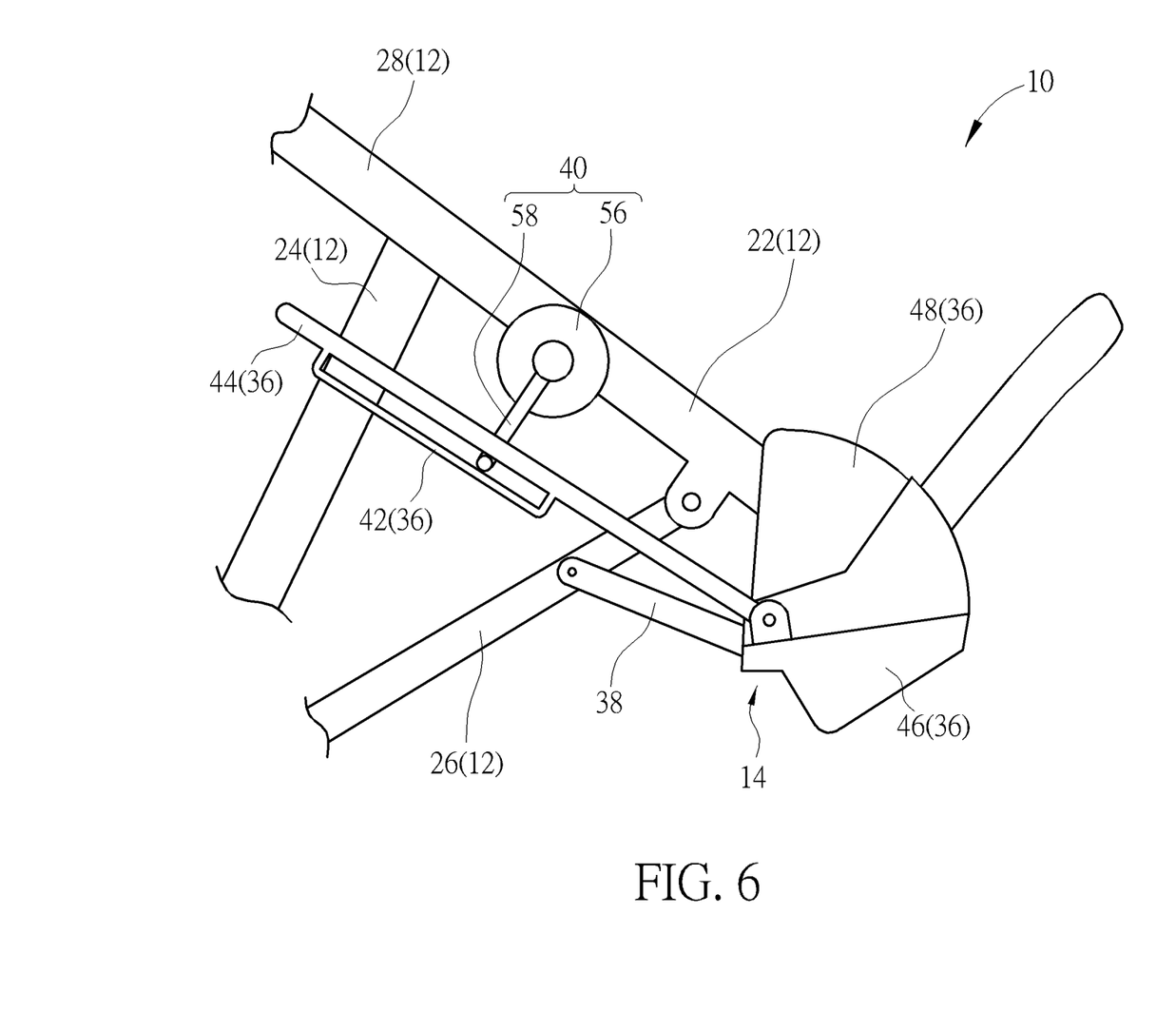

As shown in FIG. 4, the first seat unit 36 is in the first unfolding mode, and an included angle between the first seat back 44 and the first seat body 46 is small. The sliding bar 58 of the seat back positioning member 40 can be positioned at a lower area of the sliding slot portion 42, and abut against the first seat back 44 stayed at an inclined angle of the first unfolding mode. As shown in FIG. 5 and FIG. 6, the first seat unit 36 can be switched from the first unfolding mode to the second unfolding mode. The sliding bar 58 can be rotated via the rotation plate 56, and the sliding bar 58 can be moved from the lower area to a higher area of the sliding slot portion 42 and then from the higher area to a middle area of the sliding slot portion 42; meanwhile, the included angle between the first seat back 44 and the first seat body 46 can be increased, and the sliding bar 58 can hold the first seat back 44 stayed at another inclined angle of the second unfolding mode, which is different from the inclined angle of the embodiment shown in FIG. 4.

Figure 7:
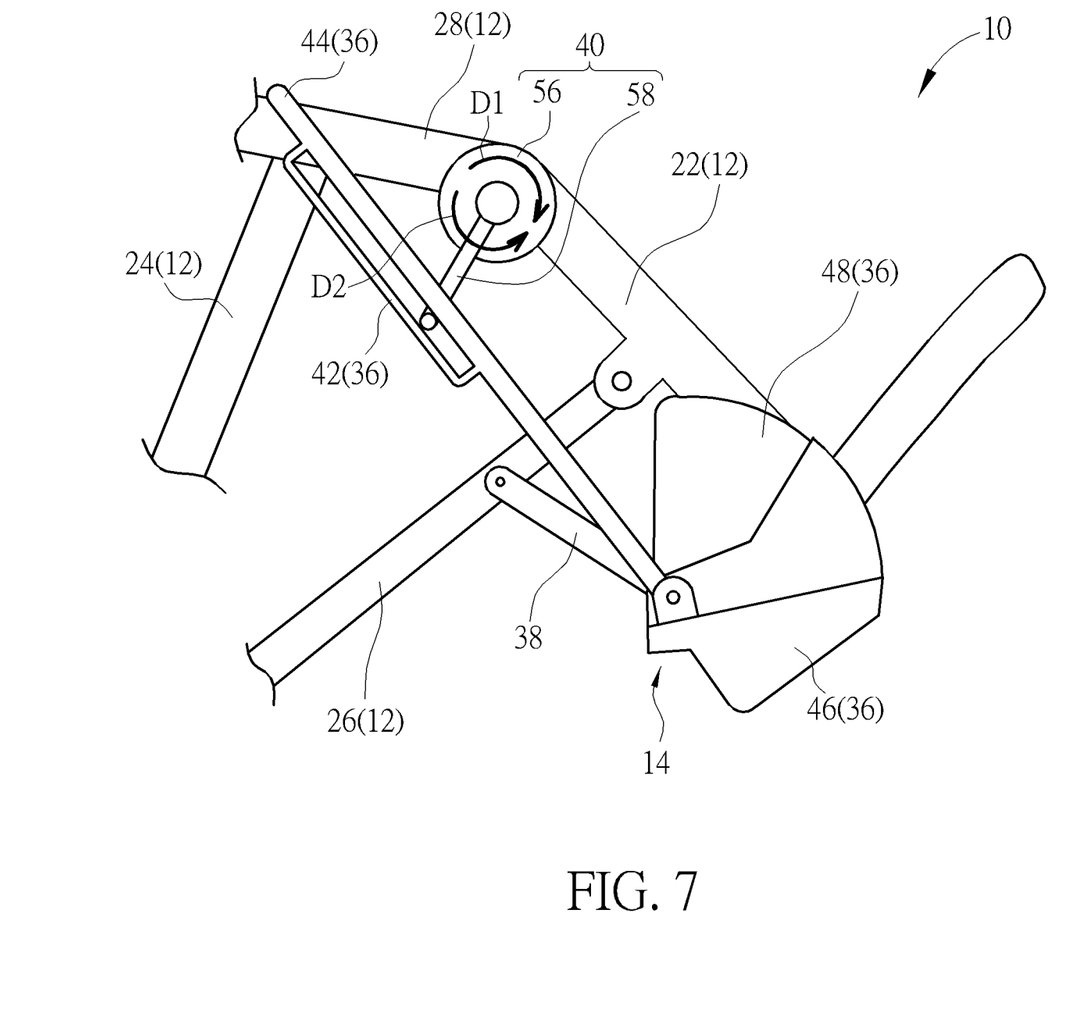
Figure 8:
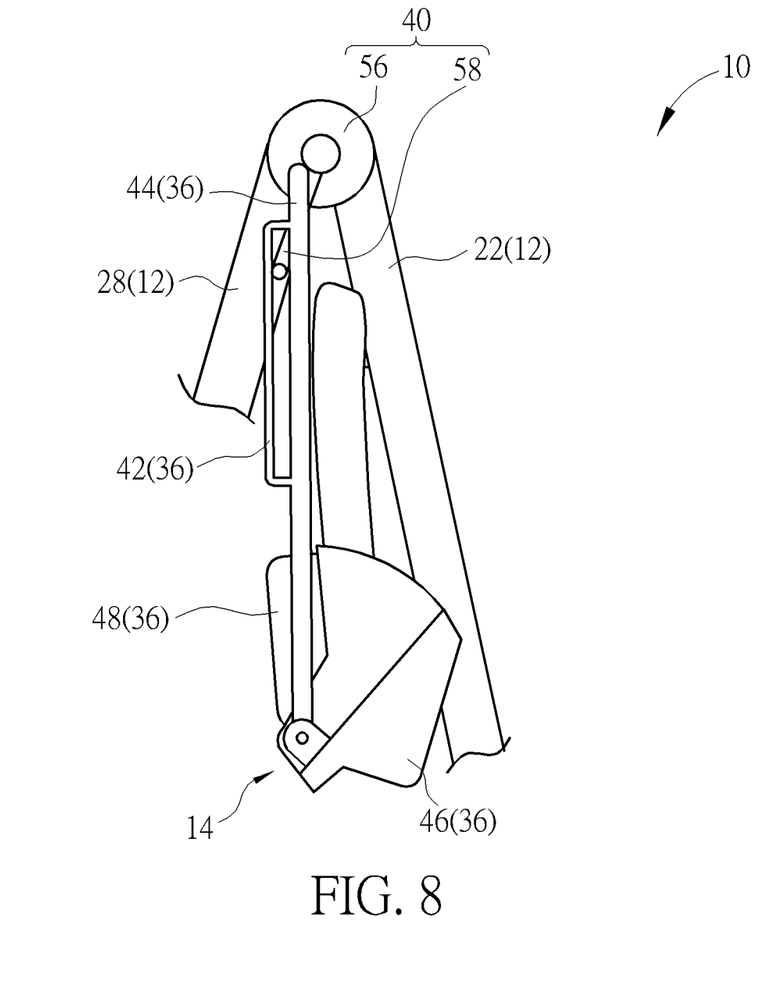

As shown in FIG. 6 and FIG. 7, if the stroller frame 12 is folded, such as lifting the locking member 30 to rotate the front leg member 22 in a first rotation direction D1 and further rotate the supporting member 26 and the handle member 28 in a second rotation direction D2, the sliding bar 58 can be upwardly slid inside the sliding slot portion 42, and the sliding slot portion 42 can be utilized to rotate the first seat back 44 toward the first seat body 46 in the first rotation direction D1. As shown in FIG. 7 and FIG. 8, when the sliding bar 58 is positioned at an upper area of the sliding slot portion 42, the first seat back 44 and the first seat body 46 can be folded, and the first seat back 44 may be parallel to the front leg member 22 and the handle member 28 if the front leg member 22 and the handle member 28 are folded.

Therefore, when the stroller frame 12 is folded, the seat body positioning member 38 can pull the bottom of the first seat back 44 and the left of the first seat body 46 downwardly, and the seat back positioning member 40 can move the sliding bar 58 to the upper area of the sliding slot portion 42, so that the first seat back 44 can be folded relative to the first seat body 46, and the first seat unit 36 can be stayed at the folding mode. When the stroller frame 12 is unfolded, the seat body positioning member 38 can push the bottom of the first seat back 44 and the left of the first seat body 46 upwardly, and the first seat back 44 can be unfolded relative to the first seat body 46 for switching the first seat unit 36 into the service mode. Besides, the seat back positioning member 40 can move the sliding bar 58 to the lower area or the middle area of the sliding slot portion 42, and the first seat unit 36 can be switched to the first unfolding mode or the second unfolding mode of the service mode.

Figure 9:
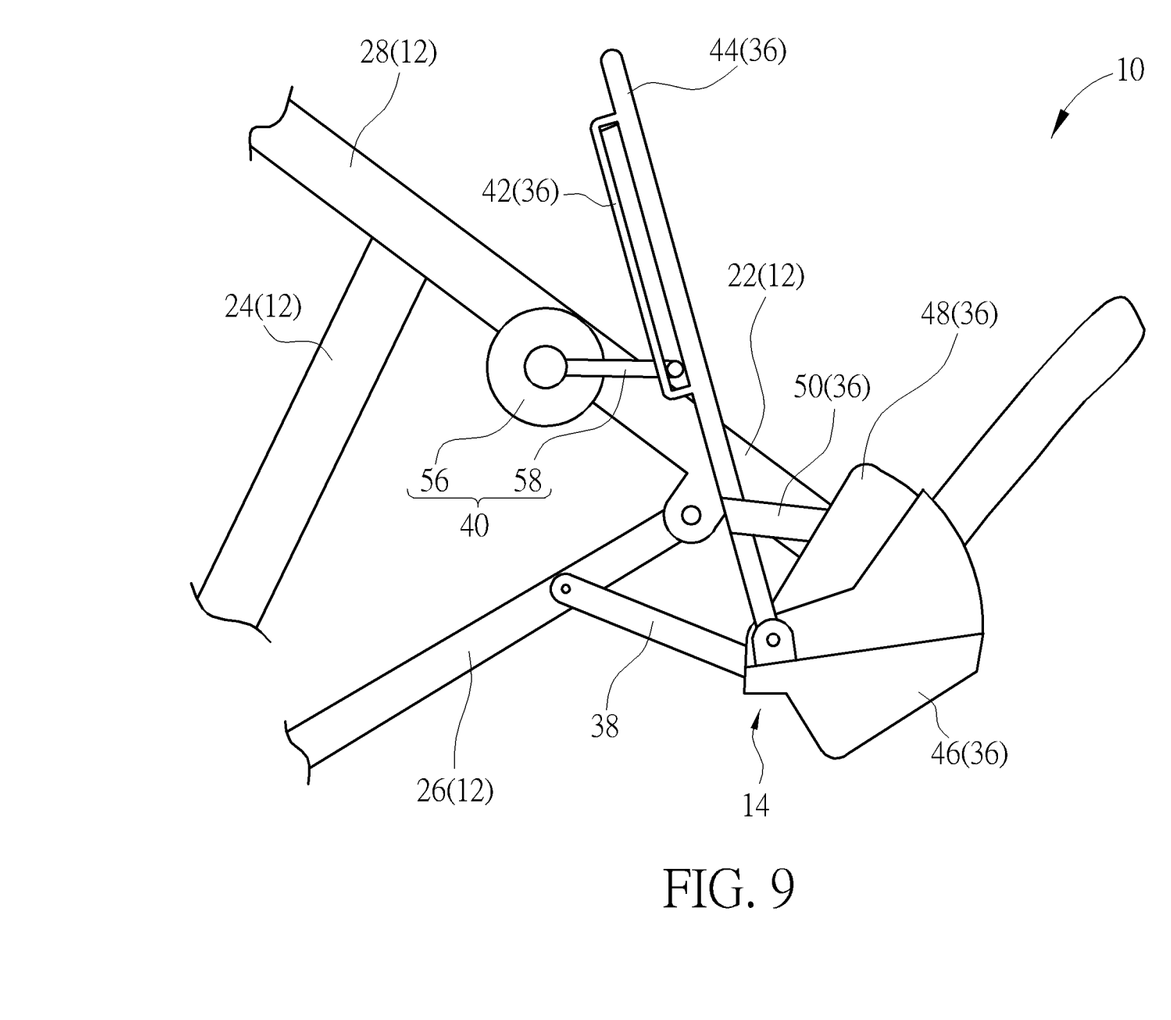
Figure 10:
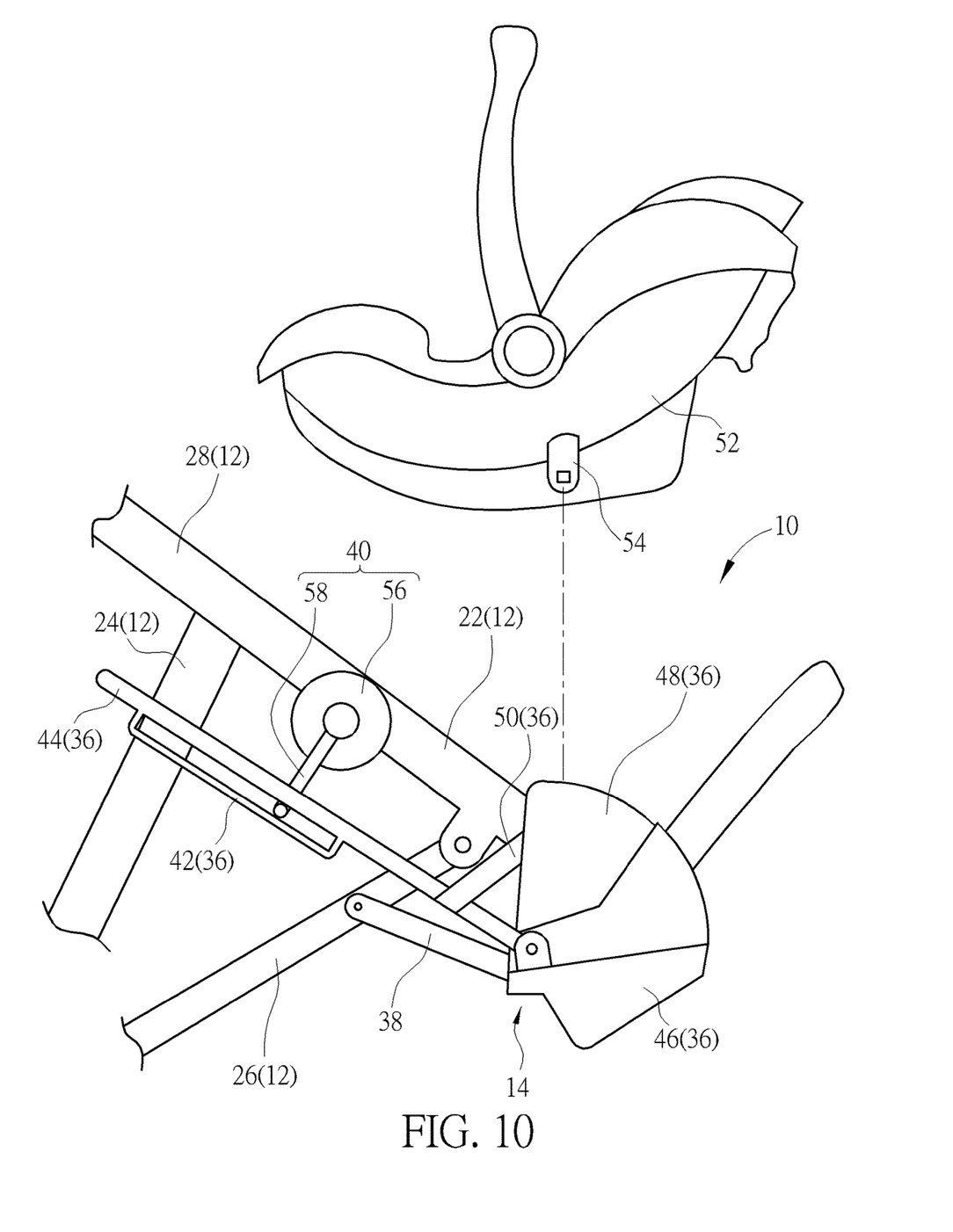

As shown in FIG. 9, the first seat unit 36 is in the first unfolding mode, and the infant car seat connecting member 48 can be accommodated inside the first seat body 46. As shown in FIG. 10, the first seat unit 36 can be switched from the first unfolding mode to the second unfolding mode. When the first seat back 44 is rotated relative to the first seat body 46 to increase the inclined angle between the first seat back 44 and the first seat body 46, the belting member 50 can be pulled by the first seat back 44 for moving the infant car seat connecting member 48 relative to the first seat body 46; for example, the infant car seat connecting member 48 may be moved out of the first seat body 46, and therefore the infant car seat 52 can be assembled with the multi child stroller 10 via the infant car seat connecting member 48. Generally, the belting member 50 can be a soft textile product or a solid buckling structure. Any material capable of sustaining a pulling force applied by the first seat back 44 belongs to a scope of the belting member 50 in the present invention.

In conclusion, the multi child stroller of the present invention can provide an angle adjustment function of the first seat back via the seat back positioning member, and the first seat back is not structurally interfered with the second seat when the stroller frame is folded and unfolded. In addition, the first seat of the multi child stroller can simultaneously utilize the belting member to pull the infant car seat connecting member out of the first seat body when the angle adjustment function for the first seat back is executed, so the infant car seat can be assembled with the multi child stroller conveniently.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A multi child stroller, comprising:
a stroller frame, having two sections adapted to fold and unfold relative to each other; and
a first seat disposed on one of the two sections, the first seat comprising:
a first seat unit, having a sliding slot portion; and
a seat back positioning member rotatably disposed on the stroller frame, the seat back positioning member comprising a sliding bar adapted to slide inside the sliding slot portion, so as to switch the first seat unit into one of a first unfolding mode, a second unfolding mode and a folding mode.

2. The multi child stroller of claim 1, wherein the first seat further comprises a seat body positioning member rotatably connected between the first seat unit and the stroller frame, the seat body positioning member positions the first seat unit in the folding mode in response to the stroller frame being folded, and further positions the first seat unit in a service mode in response to the stroller frame being unfolded.

3. The multi child stroller of claim 2, wherein two ends of the seat body positioning member are respectively connected to a first seat body of the first seat unit and a supporting member of the stroller frame.

4. The multi child stroller of claim 1, wherein the seat back positioning member positions the first seat unit in the folding mode in response to the stroller frame being folded, and further positions the first seat unit in the first unfolding mode or the second unfolding mode of a service mode in response to the stroller frame being unfolded.

5. The multi child stroller of claim 1, wherein the first seat unit further comprises a first seat back and a first seat body, the first seat back is rotatably connected to the first seat body, and the sliding slot portion is disposed on the first seat back.

6. The multi child stroller of claim 5, wherein the seat back positioning member further comprises a rotation plate disposed on the stroller frame, the sliding bar is connected to the rotation plate and slidably assembled with the sliding slot portion.

7. The multi child stroller of claim 6, wherein the sliding bar is positioned at a lower area of the sliding slot portion to abut against the first seat back stayed at the first unfolding mode, and further positioned at a middle area of the sliding slot portion to switch the first seat back from the first unfolding mode to the second unfolding mode, and further positioned at an upper area of the sliding slot portion to allow the first seat back and the first seat body for being folded and switched to the folding mode.

8. The multi child stroller of claim 5, wherein the first seat unit further comprises an infant car seat connecting member movably disposed on the first seat body and adapted to connect with an attaching member of an external infant car seat.

9. The multi child stroller of claim 8, wherein the infant car seat connecting member is accommodated inside the first seat body when the first seat unit is in the first unfolding mode, and further protrudes from the first seat body when the first seat unit is in the second unfolding mode.

10. The multi child stroller of claim 8, wherein the first seat unit further comprises a belting member connected to the infant car seat connecting member and the first seat back, and adapted to vary a position of the infant car seat connecting member relative to the first seat body when an inclined angle of the first seat back is changed.

11. The multi child stroller of claim 10, wherein the belting member is a soft textile product or a solid buckling structure.

12. The multi child stroller of claim 1, wherein the stroller frame comprises a front leg member, a rear leg member, a supporting member and a handle member, the supporting member is rotatably disposed between the front leg member and the rear leg member, the front leg member is rotatably connected to an end of the handle member, the rear leg member is rotatably connected to a segment of the handle member adjacent to the foresaid end.

13. The multi child stroller of claim 12, wherein the stroller frame further comprises a locking member disposed between the front leg member and the handle member, and adapted to constrain relative position of the front leg member and the handle member for steadying the stroller frame in the folding mode or a service mode.

14. The multi child stroller of claim 12, wherein the front leg member comprises a first wheel, the rear leg member comprises a second wheel.

15. The multi child stroller of claim 12, wherein the handle member is disposed above the front leg member and the rear leg member, the front leg member is set as a front section of the two sections, the handle member and the rear leg member are set as a rear section of the two sections.

16. The multi child stroller of claim 12, wherein the first seat unit is rotatably disposed on the front leg member, the first seat further comprises a seat body positioning member rotatably connected between the first seat unit and the stroller frame, the seat body positioning member is rotatably connected to the supporting member, the seat back positioning member is rotatably disposed on a connection position between the front leg member and the handle member.

17. The multi child stroller of claim 1, wherein the multi child stroller further comprises a bench seat rotatably disposed on the other section of the two sections.

18. The multi child stroller of claim 17, wherein the multi child stroller further comprises a stand platform disposed on the other section of the two sections and adjacent to the bench seat.

19. The multi child stroller of claim 1, wherein the multi child stroller further comprises a second seat detachably disposed on the other section of the two sections.

* * * * *